United States Patent [19]

Debnath

[11] Patent Number: 5,627,113
[45] Date of Patent: May 6, 1997

[54] COPPER ACTIVATED THERMOLUMINESCENCE DOSIMETER AND METHOD

[75] Inventor: Radhaballabh Debnath, Calcutta, India

[73] Assignee: Council of Scientific & Industrial Research, New Delhi, India

[21] Appl. No.: 393,936

[22] Filed: Feb. 22, 1995

[51] Int. Cl.$^6$ ............................. C03C 3/06; C09K 11/08
[52] U.S. Cl. ........................... 501/54; 252/301.4 R
[58] Field of Search ................. 501/54; 252/301.4 R

[56] References Cited

U.S. PATENT DOCUMENTS

| | | | |
|---|---|---|---|
| 3,779,781 | 12/1973 | Baak et al. | 501/54 |
| 3,855,144 | 12/1974 | Barber et al. | 501/54 |
| 4,248,731 | 2/1981 | Takenaga et al. | 252/301.4 |
| 4,303,547 | 12/1981 | Brownlow | 252/301.4 |
| 4,798,681 | 1/1989 | Oversluizen et al. | 252/301.4 |
| 4,814,105 | 3/1989 | Oversluizen et al. | 252/301.4 |
| 5,071,793 | 12/1991 | Jean et al. | 501/16 |

FOREIGN PATENT DOCUMENTS

| | | | |
|---|---|---|---|
| 989078 | 4/1965 | United Kingdom | 501/54 |

*Primary Examiner*—Mark L. Bell
*Assistant Examiner*—Louis M. Troilo
*Attorney, Agent, or Firm*—Fish & Richardson P.C., P.A.

[57] ABSTRACT

A novel copper activated thermoluminescence dosimeter comprising a glass composition having: about 94–97 weight percent $SiO_2$; about 0.4 to 2 weight percent $Al_2O_3$; about 0.02 to 1 weight percent $M_2O$, where M comprises $Na^+$ or $K^+$; about 2 to 6 weight percent $B_2O_3$; and Cu(I), where Cu(I) is present at a level between about $10^{18}$ to $10^{19}$ ions/cm$^3$; method of making the same.

1 Claim, No Drawings

COPPER ACTIVATED THERMOLUMINESCENCE DOSIMETER AND METHOD

This invention relates to a thermoluminescence dosimeter (TLD) glass composition which is useful for X ray or radiation and process for the preparation of such a composition.

Crystals and glasses on exposure to high energy radiation like x-rays, γ-rays and to particle radiations, like and particles, frequently suffer structural damage. Such irradiated crystals or glasses on subsequent thermal annealing get back to their original structure some time with the emission of luminescence which is commonly known as thermoluminescence (TLD). Thermoluminescence phenomenon of such a material being an outcome of high energy irradiation, it can successfully be used in estimating the radiation dose experienced by the materials. The phenomenon of using thermoluminescence property of a material in determining the radiation level of a high energy radiation environment is known as thermoluminescence dosimetry (TLD) and the device made on this principle is known as thermoluminescence dosimeter.

A thermoluminescence dosimeter is commonly used in personal monitoring (i.e. to monitor the radiation dose experienced by a person working in such a radiation environment) and in medical applications, e.g. radiation therapy. In each case, a thermoluminescence dosimeter is used in the form of a badge. In the recent years, however, attempt has been made to use such dosimeter in monitoring high level radiation sources frequently used in industries related to chemical technology (such as polymerization, vulcanization of rubber, cracking of hydrocarbon), food processing and materials testing.

A thermoluminescence dosimeter, used for the above described applications is superior to other dosimeter systems because of the following qualities:

1. It gives stable response in widely varying environmental conditions.
2. It is reusable.
3. Incurs low average cost per dose measurement.

A variety of thermoluminescence phosphors like Calcium Sulphate: Dysprosium ($CaSO_4$:DY), Lithium Fluoride TLD-100 (LiF, TLD-100), Calcium Sulphate:Thulium ($CaSO_4$:Tm), Lithium Fluoride TLD-600 (LiF TLD-600) are known which are regularly used in X-ray and -ray dosimetry. However, in most of the cases, they are used in low-level radiation detection because of their low-level saturation limit (~$10^4$R). On the other hand, radiation doses used in Chemical technology or in food processing, materials testing lie in the range $10^4$–$10^8$ R. Hence, conventional thermoluminescence materials are not suitable for such high level dosimetry.

The present invention provides a process for the preparation of a novel copper activated thermoluminescence dosimeter (T.L.D.) glass having relatively wider measurable range which can be successfully used in low level and to some extent in high level (~$10^6$R) X-ray and -ray dosimetry.

The glass composition of the present invention is novel and bears an ultimate composition (wt%) $SiO_2$=94–97%, $Al_2O_3$=0.4–2%, $M_2O$=0.02 –1% (M=$Na^+/K^+$), $B_2O_3$ =2–6% and Cu(I)=$10^{18}$–$10^{19}$ ions/$cm^3$. Upon X or -irradiation and subsequent thermal stimulation the glass emits thermoluminescence (TL). We name the glass developed in the present invention as Alumino-silicate: Copper TLD glass (Al—Si: Cu TLD glass) which structurally consists of a network of tetrahedral silica with frequent aluminum (+3) substitution in the sites of silicon. The cuprous ions ($Cu^{+1}$) in the glass preferentially reside at the aluminum sites as compensating cations. Upon X or -irradiation of the glass 'hole' centres of the type [$AlO_4$/Cu] are generated which act as thermoluminescence centre on subsequent thermal stimulation.

The Main Advantages of the Invention are as Follows

1. It is a glassy T.L.D. material having greater chemical stability towards humidity and normal temperature conditions.
2. The material has superior reusability compared to other conventional T.L.D. materials.
3. Larger measurable dose range.

Accordingly, the present invention relates to a process for the preparation of a novel thermoluminescence dosimeter (T.L.D.) glass which comprises:

a) Preparation of a silicate glass of composition (mole %) $SiO_2$ =62–67%, $B_2O_3$=24–28%, $M_2O$=6–8% (M=$Na^+$ or $K^+$) $Al_2O_3$ =1–3%, CO=0.5–1% by melting at a temperature in the range of 1400°–1500° C.

b) Casting of the glass in the shape of a slab.

c) Cutting of the glass in the form of plates of dimensions (40–50 mm)×(15–30 mm)×(3–5 mm).

d) Heat-treating the glass plates at 550°–600° for 20–30 hours to achieve a phase separation of soluble borate phase out of the insoluble silica phase.

e) Leaching out of the soluble borate phase from the glass first treating with hot (90°–100° C.) distilled water for 10–24 hours then with dilute 0.1–0.3/N hydrochloric acid for 40–60 hours.

f) Finally repeatedly washing the leached porous glass with distilled water until all chloride ions are removed from the glass.

g) The silica rich porous glass thus obtained had the composition (wt.%) $SiO_2$ =94–97%, $Al_2O_3$ =0.4–2%, $M_2O$=0.02–0.1% (M=$Na^+/K^+$) and $B_2O_3$=2–6%. Using this porous glass plates we have prepared the Cu(I) activated thermoluminescence dosimeter (TLD) glass as follows.

h) Firing of the porous glass in a furnace at a temperature in the range of 500°–700° C. under constant flow of air to burn out trapped impurities in the pores of the glass.

i) Cooling the porous glass to room temperature.

j) Impregnating the glass with a solution of an organo-copper complex in an organic solvent.

k) Drying the impregnated glass in the temperature range 30°–50° C.

l) Slowly heating the composition initially in air up to 400°–600° C. for 3–4 hours then under a constant flow of an inert gas or inert + hydrogen gas up to 900°–1000° C. for 6–10 hrs.

m) Sintering the glass into monolithic plate at a temperature in the range of 1100°–1200° C.

The porous composition prepared may be preferably made in the form of plates and the organo-copper complex used may be selected out of following compounds: copper-biurate, tetraammino copper, cupro-dipyridine, cuprous chloride.

The organic solvent used in preparing the solution of the copper complex is selected out of the following solvents: Ethanol, acetone, benzene, diethyl ether, pyridine and the like. The concentration of the complex used may range 1–3% (wt.).

The inert gas used is selected out of the gases like Argon, Helium and Nitrogen.

A glass obtained by the process described above of the present invention is perfectly colourless and contains almost all copper in the monovalent state.

The invention as illustrated by the examples given below should not be construed to limit the scope of the invention.

EXAMPLE 1

A porous glass of compositions (wt.%), $SiO_2$ =96%, $B_2O_3$=3%, $Al_2O_3$=1%, $Na_2O$=0.06% in the shape of a plate of dimensions (20 mm×50 mm×5 mm) was prepared by following the methods described in the specification. It was fired slowly up to a temperature of 600° C. under constant flow of air to burn out all the organic matters trapped in the pores—it was then cooled to room temperature (30° C.) —impregnated with a 2 percent (wt.) solution of cuprodipyridine in pyridine—the composition was allowed to dry at ambient temperature then heated very slowly up to a temperature of 500° C. in air for 4 hours and then in Argon atmosphere up to a temperature of 1000° for 10 hours and finally it was sintered into a monolithic glass at 1150°–1200° C. in Argon atmosphere. The product was a successful thermoluminescence dosimeter (TLD) glass having composition (wt.%), $SiO_2$=96%, $B_2O_3$=3%, $Al_2O_3$=1%, $Na_2O$= 0.06%, $Cu(I)$=2.5×10$^{18}$ ions/cm$^3$.

EXAMPLE 2

In another experiment we prepared a porous glass of composition (wt. %) $SiO_2$=95%, $B_2O_3$=2.5%, $Al_2O_3$=2%, $Na_2O$ =1% in the form of plate of dimensions (20 mm×40 mm×3 mm). The glass was slowly heated in air up to 50° for 3–4 hours to burn out the trapped impurities—cooled to 40°–50° C.—then impregnated with a 0.5% (wt.) cuprous chloride solution in acetone—the composition was dried at ambient temperature—heated slowly in argon atmosphere up to 900° C. for 6 hours and finally sintered into a monolithic mass at 1100°–1150° C. in a reducing atmosphere of 10% (V) hydrogen+90% (V) argon. The glass obtained in this case was also a successful thermoluminescence dosimeter (TLD) glass of composition (wt.%) $SiO_2$= 95%, $B_2O_3$=2.5%, $Al_2O_3$=2%, $Na_2O$=1% and $Cu(I)$ 1×10$^{19}$ ions/cm$^3$.

EXAMPLE 3

In a third method we prepared a porous glass of composition (wt. %) $SiO_2$=94%, $B_2O_3$=3%, $Al_2O_3$=2%, $Na_2O$= 0.05% in the shape of a plate of dimension (15 mm×40 mm ×3 mm). It was very slowly fired in air at 500° C. for 5 hours to burn out the trapped impurities—cooled to 40°–50° C.—then impregnated with a 1% (wt.) ethanolic solution of copper-biurate. The composition was dried at ambient temperature—then slowly heated in air up to 500°–600° C. for 3–4 hours. The temperature was slowly raised up to 1000° C. Under a constant flow of helium gas in a duration of 6 hours and finally it was sintered into a monolithic glass at 1100°–1150° C. under a reducing atmosphere of 10% (V) hydrogen and 90% (V) of helium. The product was a good thermoluminescence dosimeter glass of composition (wt. %) $SiO_2$=94%, $B_2O_3$=3%, $Al_2O_3$=2%, $Na_2O$=0.05% and $Cu(I)$ ~3.6×10$^{18}$ ions/cm$^3$.

The glass prepared is used in the powdered form for thermoluminescence dosimetric application. A calibration curve of thermoluminescence (T.L.) efficiency of the glass against the intensity of irradiation dose should first be made. For this purpose 4–5 samples of the powdered glass of definite weight (5–10 mgs) dispersed on some suitable substrate (e.g. Teflon) are exposed either to X-ray or γ-radiation (source $^{60}$Co) of known radiation flux. However, exposure time of the sample should differ from one another to make their radiation dose different. Thermoluminescence glow flux of each of the irradiated glass sample is measured quantitatively in a thermoluminescence set-up by heating the sample in the temperature range 50°–350° C. in an argon atmosphere.

The thermoluminescence glow flux of each of the sample is then plotted against respective radiation dose.

An unknown X or -ray dose level can be monitored just by exposing a known quantity of the same powdered glass in the X or -ray environment one desire to monitor, for a certain period of time and comparing its thermoluminescence glow flux with respect to the respective curve.

The glass, however, does not show thermoluminescence property if the copper ions in it do not remain in monovalent state. The copper ion concentration in the glass may be in the range 10$^{18}$–10$^{19}$ ions/cm$^3$. The glass attains radiation saturation in the dose level greater than 10$^6$ Rad.

What is claimed is:

1. A glass composition, comprising a blend having an ultimate composition including:

(a) by weight, about 94–97 percent $SiO_2$;

(b) by weight, about 0.4 to 2 percent $Al_2O_3$:

(c) by weight, about 0.2 to 1 percent $M_2O$, where M is $Na^+$ or $K^+$;

(d) by weight, about 2 to 6 percent $B_2O_3$; and (e) $Cu(I)$, wherein $Cu(I)$ is present between about 10$^{18}$ to 10$^{19}$ ions/cm$^3$.

\* \* \* \* \*